United States Patent
Yamashita et al.

(10) Patent No.: US 6,330,979 B2
(45) Date of Patent: Dec. 18, 2001

(54) VEHICLE AIR CONDITIONER WITH AUTOMATICAL SELECTION OF FOOT MODE AND FOOT/DEFROSTER MODE

(75) Inventors: Kouji Yamashita, Obu; Satohisa Yoshida, Anjo; Makoto Umebayashi, Chiryu; Seiji Kamei, Nagoya; Hiroyuki Hotta, Toyota; Hidekazu Uramune, Nishikamo-gun, all of (JP)

(73) Assignees: Denso Corporation, Kariya; Toyota Jidosha Kabushiki Kaisha, Toyota, both of (JP)

( * ) Notice: Subject to any disclaimer, the term of this patent is extended or adjusted under 35 U.S.C. 154(b) by 0 days.

(21) Appl. No.: 09/729,555

(22) Filed: Dec. 4, 2000

(30) Foreign Application Priority Data

Dec. 16, 1999 (JP) .................................................. 11-357994
Jun. 8, 2000 (JP) .................................................. 12-172107

(51) Int. Cl.$^7$ ..................................................... B60H 1/02
(52) U.S. Cl. ............................... 237/12.3 R; 237/12.3 B; 165/42
(58) Field of Search .................................. 454/121, 148; 237/12.3 B, 12.3 R; 165/42

(56) References Cited

U.S. PATENT DOCUMENTS

| | | |
|---|---|---|
| 5,137,213 | 8/1992 | Yamamoto et al. . |
| 5,566,881 * | 10/1996 | Inoue et al. ...................... 237/12.3 B |
| 5,794,845 * | 8/1998 | Ito et al. ........................... 237/12.3 B |
| 5,884,839 * | 3/1999 | Aoki et al. ........................ 237/12.3 R |
| 5,931,380 * | 8/1999 | Aoki et al. ........................ 237/12.3 B |

* cited by examiner

Primary Examiner—Harold Joyce
Assistant Examiner—Derek Boles
(74) Attorney, Agent, or Firm—Harness, Dickey & Pierce, PLC

(57) ABSTRACT

In a vehicle air conditioner where a foot mode and a foot/defroster mode can be set, when a target temperature of air blown into a passenger compartment is higher than a predetermined temperature, the foot mode is selected. However, even if the target temperature of air is higher than the predetermined temperature, the foot/defroster mode is selected in place of the foot mode when an outside air temperature is lower than a predetermined temperature and when a vehicle speed is higher than a predetermined speed. In the vehicle air conditioner, because the foot/defroster mode can be suitably automatically selected based on a fog-generation condition of a windshield, both fog-preventing performance of the windshield and heating performance of the passenger compartment are improved during heating operation.

20 Claims, 8 Drawing Sheets

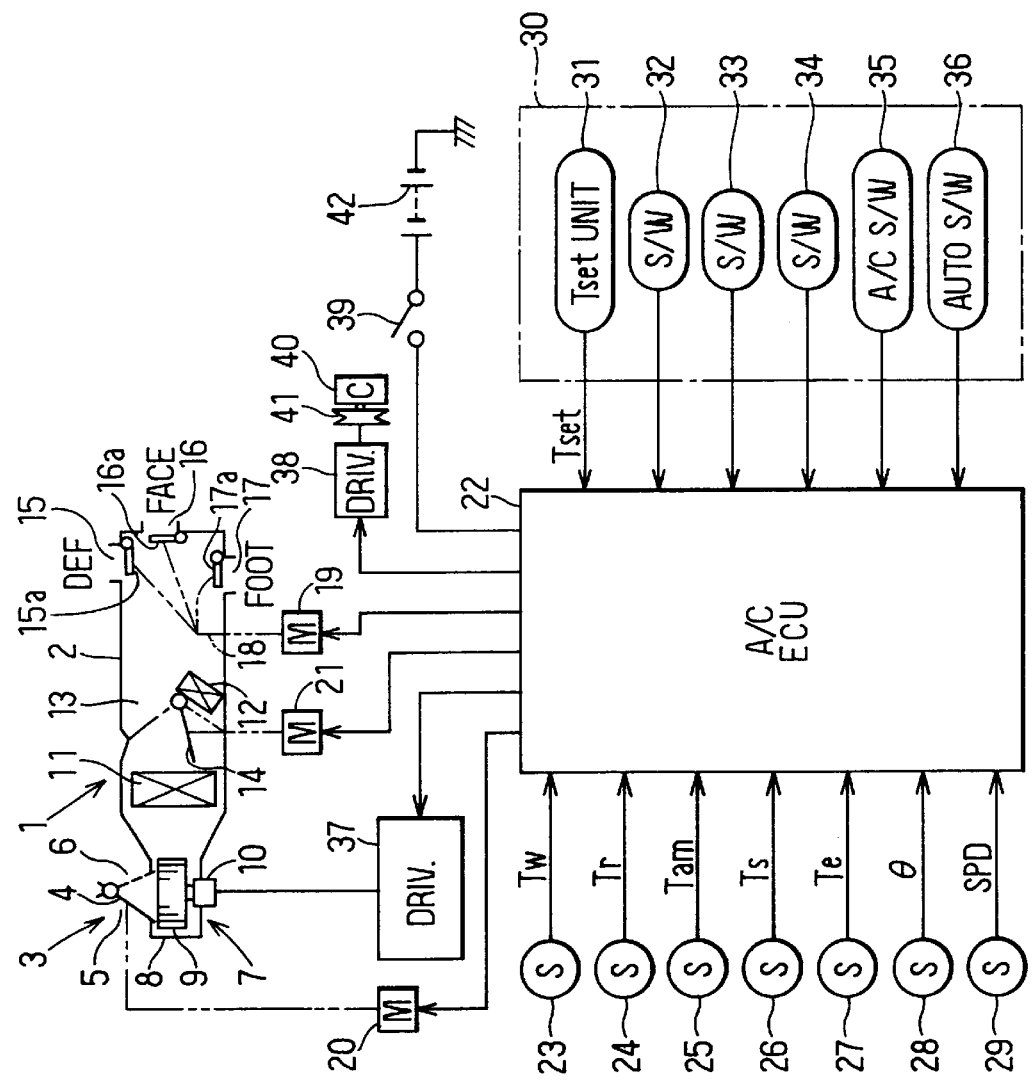

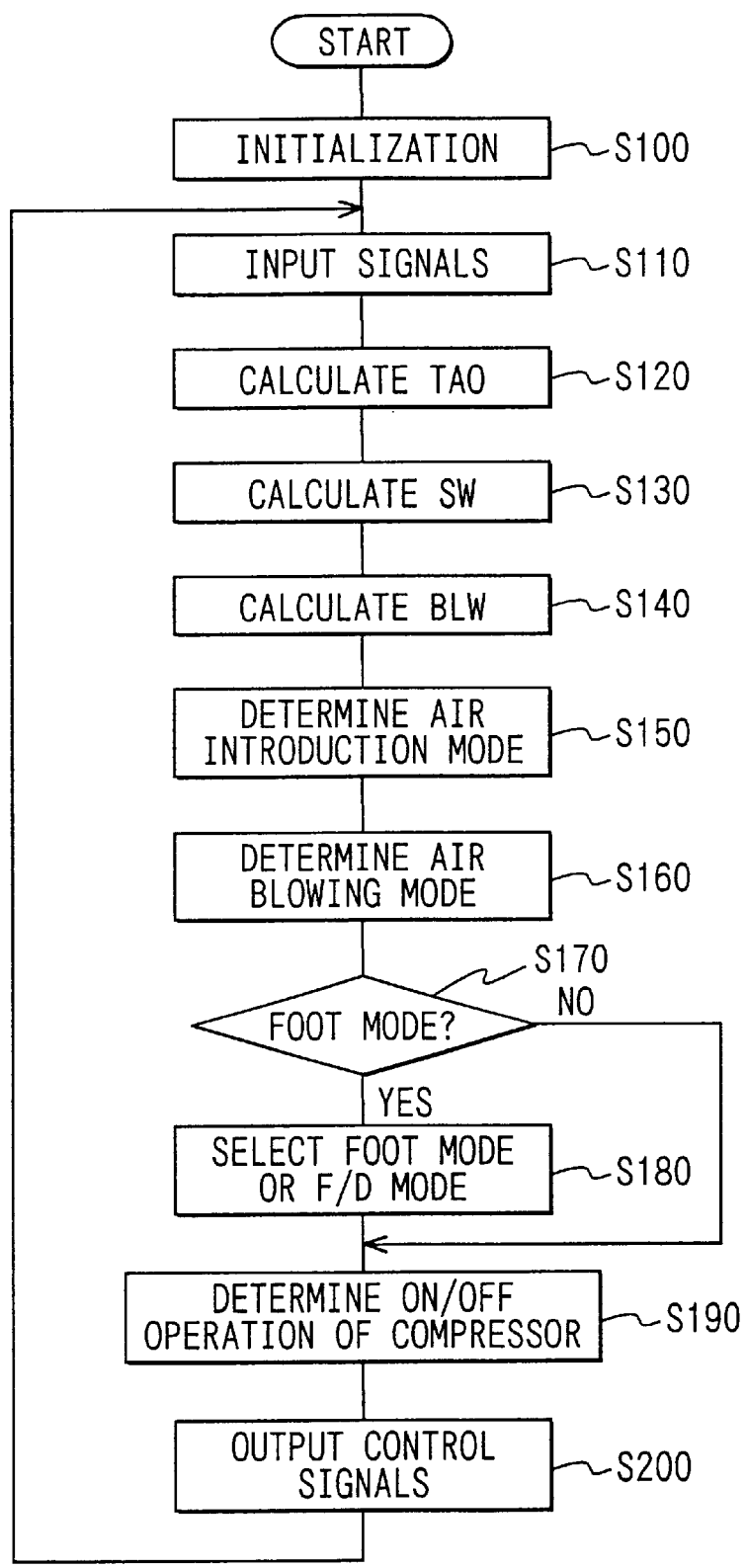

VEHICLE AIR CONDITIONER WITH AUTOMATICAL SELECTION OF FOOT MODE AND FOOT/DEFROSTER MODE

CROSS-REFERENCE TO RELATED APPLICATION

This application is related to and claims priority from Japanese Patent Applications No. Hei. 11-357994 filed on Dec. 16, 1999 and No. 2000-172107 filed on Jun. 8, 2000, the contents of which are hereby incorporated by reference.

BACKGROUND OF THE INVENTION

1. Field of the Invention

The present invention relates to a vehicle air conditioner which automatically determines a windshield-fogging condition and automatically selects a foot/defroster mode to prevent a windshield from being fogged during heating operation in winter.

2. Description of Related Art

In a conventional automatic control type air conditioner for a vehicle, generally, heating operation for a passenger compartment is started from a foot mode in winter. During the foot mode, a large amount of air to be blown into the passenger compartment (e.g., about 70 to 80%) is blown toward the foot area of a passenger in the passenger compartment from a foot outlet, and a small amount of air is blown toward a windshield from a defroster outlet.

At a cold time when outside air temperature decreases to 0° C. or lower, if only a small amount of air (warm air) is blown toward the windshield from the defroster outlet, the temperature of the windshield is not sufficiently increased, and the inner surface of the windshield is readily fogged. Accordingly, a driver (passenger) manually switches an air-blowing mode to a foot/defroster mode or a defroster mode to defrost the windshield.

In this case, whenever the windshield is fogged, it is necessary for the driver to manually set the foot/defroster mode or the defroster mode, and the manual operation annoys the driver.

U.S. Pat. No. 5,137,213 discloses a vehicle air conditioner for improving both defrosting performance for a windshield and heating performance for a passenger compartment. That is, a first defroster/foot mode corresponding to the foot mode and a second defroster/foot mode corresponding to the foot/defroster mode are set as a defroster/foot mode where air is blown toward the inner surface of the windshield from the defroster outlet while air is blown to the foot area (lower side) from the foot outlet. In the first defroster/foot mode, an amount of air blown from the defroster outlet is made smaller. In the second defroster/foot mode, the amount of air blown from the defroster outlet is made larger than that during the first defroster/foot mode. When the outside air temperature is low, the windshield is prevented from being fogged by setting the second defroster/foot mode. When a target temperature of air blown into the passenger compartment is set higher than a predetermined temperature, the air-blowing mode is switched to the first defroster/foot mode while air-blowing amount is increased in accordance with an increase of the target temperature.

However, since the air-blowing mode is switched between the first defroster/foot mode and the second defroster/foot mode) according to only the conditions of the target temperature of air blown into the passenger compartment and the outside air temperature, a windshield-fogging condition cannot be accurately determined, and the windshield may be fogged.

On the other hand, if a setting range of the foot/defroster mode is simply enlarged in order to improve the fog-preventing performance of the windshield, a setting range of the foot mode is relatively reduced, thereby deteriorating the heating performance of the passenger compartment.

SUMMARY OF THE INVENTION

In view of the foregoing problems, it is an object of the present invention to provide a vehicle air conditioner that improves both of fog-preventing performance of a windshield and heating performance of a passenger compartment by suitably selecting a foot/defroster mode based on a windshield-fogging condition.

According to the present invention, in a vehicle air conditioner which can set a foot mode and a foot/defroster mode, a control unit sets the foot mode when a target temperature of air blown into a passenger compartment is higher than or equal to a predetermine target value. The control unit selects the foot/defroster mode in place of the foot mode, when at least one of a first condition where a vehicle speed is higher than or equal to a predetermined speed and a second condition where a sunlight amount entering into the passenger compartment is lower than or equal to a predetermined amount is satisfied. Therefore, a windshield-fogging condition can be suitably determined based on at least the vehicle speed and the sunlight amount, and the foot/defroster mode can be automatically set based on the windshield-fogging condition. Accordingly, the fog-preventing performance of the windshield can be improved without a manual operation of a driver. Further, when the windshield-fogging condition is not determined, the foot mode is always set in a heating operation, so that heating performance in the passenger compartment is improved.

Preferably, the foot/defroster mode is selected in place of the foot mode, when a third condition where an outside air temperature is lower than or equal to a predetermined outside temperature is further satisfied in addition to the first and second conditions. Therefore, the windshield-fogging condition can be accurately determined.

Alternatively, the control unit selects the foot/defroster mode in place of the foot mode, when a temperature of the windshield is lower than a predetermined temperature. The temperature of the windshield can be estimated based on parameters relating to the temperature of the windshield. For example, the parameters are the outside air temperature and the vehicle speed, the outside air temperature and the sunlight amount, three the outside air temperature, the vehicle speed and the sunlight amount, or the like. In addition, the temperature of the windshield can be directly detected using a temperature sensor.

Preferably, the control unit includes a foot mode selection portion for selecting the foot mode when a target temperature of air blown into the passenger compartment is larger than a predetermined target value, a determining portion for determining a warm-up control or a stationary heating control, and a foot/defroster mode selection portion for selecting the foot/defroster mode in place of the foot mode. When the determining portion determines the warm-up control, the foot/defroster mode selection portion selects the foot/defroster mode when the outside air temperature is lower than a predetermined temperature and when the sunlight amount entering into the passenger compartment is lower than a predetermined amount. On the other hand, when the determining portion determines the stationary heating control, the foot/defroster mode selection portion selects the foot/defroster mode when the outside air temperature is lower than a predetermined temperature and when the vehicle speed is higher than a predetermined speed. Accordingly, during the warm-up control or the stationary heating control, the windshield-fogging condition can be accurately determined, and the foot mode and the foot/defroster mode can be automatically selectively set in accordance with a vehicle condition.

BRIEF DESCRIPTION OF THE DRAWINGS

Additional objects and advantages of the present invention will be more readily apparent from the following detailed description of preferred embodiments when taken together with the accompanying drawings, in which:

FIG. 1 is a schematic diagram showing an entire structure of a vehicle air conditioner according to a first preferred embodiment of the present invention;

FIG. 2 is a flow diagram showing a control process of ECU of the vehicle air conditioner according to the first embodiment;

DETAILED DESCRIPTION OF THE PRESENTLY PREFERRED EMBODIMENTS

Figure 3A:
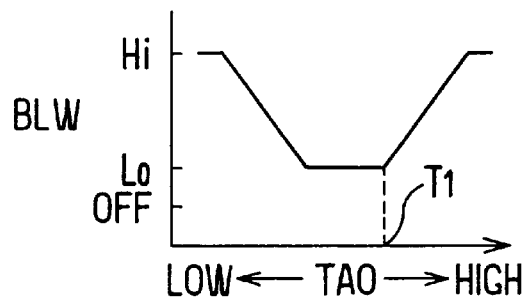
FIGS. 3A and 3B are characteristic views showing a basic control and a warm-up control, respectively, according to the first embodiment.

Preferred embodiments of the present invention will be described hereinafter with reference to the accompanying drawings.

A first preferred embodiment of the present invention will be now described with reference to FIGS. 1–8. An air conditioning case 2 of an air conditioner 1 is disposed inside a dashboard on a front side of a passenger compartment to form an air passage through which air flows into the passenger compartment. An inside/outside air switching box 3 is provided at an upstream end of the air conditioning case 2, and an inside/outside air switching damper 4 is provided within the inside/outside air switching box 3. By the inside/outside air switching damper 4, an inside air inlet 5 and an outside air inlet 6 are opened and closed. Thus, air inside the passenger compartment (inside air) and air outside the passenger compartment (outside air) are switched to be selectively introduced into the inside/outside air switching box 3. A blower 7 is disposed at a downstream side of the inside/outside air switching box 3, and a centrifugal type blower fan 9 is contained within a case 8 of the blower 7. The blower 7 is rotated by a driving motor 10.

At a downstream side of the blower 7, an evaporator 11 is disposed as a cooling heat exchanger. The evaporator 11 is provided in a refrigerating cycle including a compressor 40 driven by a vehicle engine (not shown in the drawing). Low-pressure refrigerant, flowing into the evaporator 11, absorbs heat from blown air to be evaporated, so that air passing through the evaporator 11 is cooled.

An electromagnetic clutch 41 is provided in the compressor 40 so that driving power of the vehicle engine is transmitted to the compressor 40 via the electromagnetic clutch 41.

A hot water type heater core (i.e., heating heat exchanger) 12, for heating air by hot water for cooling the vehicle engine (cooling water) as a heat source, is disposed within the air conditioning case 2 at a downstream side of the evaporator 11. A bypass passage 13 is provided on a side of the hot water type heater core 12 so that air can bypass the hot water type heater core 12 through the bypass passage 13.

A plate-like air mixing damper 14 is disposed between the evaporator 11 and the heater core 12 to be rotatable. The air mixing damper 14 is used as a temperature adjustment unit for adjusting temperature of air blown into the passenger compartment by adjusting a ratio of warm air passing through the hot water type heater core 12 and the cool air passing through the bypass passage 13. The warm air from the hot water type heater core 12 and the cool air from the bypass passage 13 are mixed at a downstream side of the hot water type heater core 12, so that air having desired temperature is obtained.

Further, a defroster outlet 15, a face outlet 16 and a foot outlet 17, which form an air-blowing mode switching portion, are provided on a downstream end of the air conditioning case 2. From the defroster outlet 15, air is blown toward an inner surface of the windshield via a defroster duct (not shown in the drawing). The defroster outlet 15 is opened and closed by a plate-like defroster damper 15a disposed rotatably.

From the face outlet 16, air is blown toward the upper body of a passenger in the passenger compartment via a face duct (not shown in the drawing). The face outlet 16 is opened and closed by a plate-like face damper 16a disposed rotatably. From the foot outlet 17, air is blown toward the foot area of the passenger in the passenger compartment via a foot duct (not shown in the drawing). The foot outlet 17 is opened and closed by a plate-like foot damper 17a disposed rotatably.

The dampers 15a, 16a, 17a for setting an air-blowing mode are connected to a common link mechanism 18. Through the link mechanism 18, the dampers 15a, 16a, 17a are driven by an electrical driving unit 19 such as a servomotor. The inside/outside air switching damper 4 and the air mixing damper 14 are also respectively driven by electrical driving units 20, 21 (e.g., servomotors).

An air-blowing mode such as a face mode, a bi-level mode, a foot mode, a foot/defroster mode and a defroster mode can be set by selectively opening and closing dampers 15a, 16a, 17a in the first embodiment. That is, during the face mode, only the face outlet 16 is fully opened so that air is blown toward the upper body of the passenger in the passenger compartment from the face outlet 16. During the bi-level mode, both of the face outlet 16 and the foot outlet 17 are opened, so that air is blown toward the upper body and the foot area of the passenger in the passenger compartment. During the foot mode, the foot outlet is fully opened and the defroster outlet 15 is opened by a small opening degree, so that air is mainly blown from the foot outlet 17 and a small amount of air is blown from the defroster outlet 15. In the foot/defroster mode, the defroster outlet 15 and the foot outlet 17 are respectively opened by approximately the same opening degree, so that the air amount blown from the foot outlet 17 is reduced and the air amount blown from the defroster outlet 15 is increased, as compared with a case during the foot mode. During the defroster mode, only the defroster outlet 15 is fully opened, so that air is blown to the inner surface of the windshield from the defroster outlet 15.

Next, an electric control portion of the vehicle air conditioner 1 according to the first embodiment will be explained. An air-conditioning electronic control unit (air-conditioning ECU) 22 is composed of a well-known microcomputer and peripheral circuits. The well-known microcomputer is composed of CPU (center proceeding unit), ROM (read only memory), RAM (random access memory) and the like. Signals from a sensor group 23–29 are input to the air conditioning ECU 22 to control operation of the vehicle air conditioner 1. The sensor group 23–29 includes a water temperature sensor 23 for detecting a water temperature Tw flowing into the heater core 12, an inside air temperature sensor 24 for detecting an inside temperature Tr, an outside air temperature sensor 25 for detecting an outside air temperature Tam, a sunlight amount sensor 26 for detecting a sunlight amount Ts entering into the passenger compartment, an evaporator air temperature sensor 27 for detecting an air temperature Te blown from the evaporator 11, an opening degree detection sensor 28 for detecting an actual opening degree θ of the air mixing damper 14, a vehicle speed sensor 29 for detecting a vehicle speed SPD, and the like.

Further, operation members operated by a passenger are provided on an air-conditioning operation panel 30 disposed around the dashboard in the passenger compartment. Operation signals from the operation members are also input to the air-conditioning ECU 22.

The operation members of the air-conditioning operation panel 30 include a temperature setting unit 31, an air flow amount switch 32, an inside/outside air change-over switch 33, an air-blowing mode switch 34, an air-conditioning switch 35, an automatic control switch 36 and the like. The temperature setting switch 31 sets a set temperature (Tset) of the passenger compartment, the air flow amount switch 32 generates an air flow amount switching signal of the blower 7, the inside/outside air change-over switch 33 generates a inside/outside air switching signal, the air-blowing mode switch 34 generates an air-blowing mode signal and the air-conditioning switch 35 generates an ON/OFF signal of the electromagnetic clutch 41 for the compressor 40 of the refrigerating cycle. Further, the automatic control switch 36 sets an air-conditioning auto control mode.

In the first embodiment, as the air-blowing mode switch 34, a defroster switch specialized for the defroster mode is provided separately from switches for respectively manually setting each of the face, foot, foot/defroster modes.

Voltage applied to the fan driving motor 10 of the blower 7 is controlled by a driving circuit 37, and a rotational speed of the blower 7 is adjusted by controlling the voltage applied to the driving motor 10. A supply of electric power to the electromagnetic clutch 41 of the compressor 40 is interrupted by a driving circuit 38. Electric power is fed to the air conditioning ECU 22 from a vehicle battery 42 via an ignition switch 39 of the vehicle engine.

Next, operation of the vehicle air conditioner having the above-described structure according to the first embodiment will be described. A flow diagram in FIG. 2 shows control operation performed by the microcomputer of the air-conditioning ECU 22. In FIG. 2, a control routine starts, when the automatic switch 36 of the air-conditioning operation panel 30 is turned on in a state when the ignition switch 39 of the vehicle engine is turned on and electric power is fed to the control unit 22.

At step S100, a flag, a timer and the like are initialized. At the next step S110, the detection signals from the sensor group 23–29 and the operation signals from the operation members 31–36 of the operation panel 30 are input.

At step S120, a target temperature TAO of air blown into the passenger compartment is calculated based on the following formula (1). The target temperature TAO is a blown air temperature required to maintain the passenger compartment at a setting temperature Tset of the temperature setting unit 31.

$$TAO = K_{set} \times Tset - K_r \times Tr - K_{am} \times Tam - K_s \times Ts + C \quad (1)$$

Wherein, Tr is an inside air temperature detected by the inside air temperature sensor 24, Tam is an outside air temperature detected by the outside air temperature sensor 25 and Ts is a sunlight amount detected by the sunlight amount sensor 26. Further, each of Kset, Kr, Kam and Ks is a control gain, and C is a correction constant.

At step S130, a target opening degree SW of the air mixing damper 14 is calculated based on the following formula (2).

$$SW = [(TAO - Te)/(Tw - Te)] \times 100(\%) \quad (2)$$

Wherein, Te is an evaporator air temperature detected by the evaporator air temperature sensor 27, and Tw is a water temperature flowing into the heater core 12 detected by the water temperature sensor 23.

At step S140, a target flow amount BLW of air blown by the blower fan 9 is calculated based on the calculated TAO. The target flow amount BLW is calculated according to the graph shown in FIGS. 3A, 3B. That is, FIG. 3A shows a basic control for determining the target flow amount BLW based on the above-described TAO. In the basic control graph of FIG. 3A, the target flow amount BLW is set higher at a high-temperature side of the TAO (maximum heating side) and at a low-temperature side of the TAO (maximum cooling side), and is set lower at an intermediate temperature area of the TAO between the high-temperature side and a low temperature side.

Figure 3B:
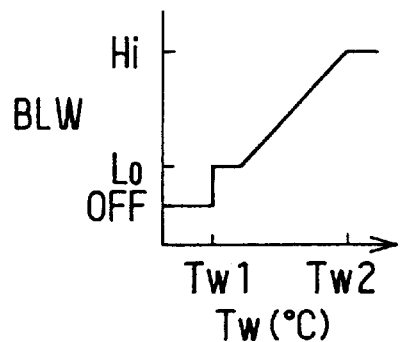

On the other hand, FIG. 3B shows a warm-up control which is generally set for preventing cool air from being blown into the passenger compartment when water temperature Tw flowing into the heater core 12 is low at a heating start time in winter. In the warm-up control, when the water temperature Tw flowing into the heater core 12 is lower than first predetermined temperature Tw1 (e.g., 30° C.), the blower 7 is stopped by stopping energizing the fan driving motor 10 of the blower 7. When the water temperature Tw flowing into the heater core 12 is higher than the predetermined temperature Tw1, the blower 7 is operated by a lowest air flow amount Lo. When the water temperature Tw flowing into the heater core 12 increases to a second predetermined temperature Tw2 (e.g., 60° C.) higher than the first predetermined temperature Tw1, voltage applied to the fan driving motor 10 of the blower 7 is increased in cooperation with this, so that the air amount blown from the blower 7 is increased to a highest air flow amount Hi. When the water temperature Tw becomes higher than the second predetermined temperature Tw2, the warm-up control is finished, and a stationary heating control where the target flow amount BLO is determined according to the basic control graph of FIG. 3A is performed.

At step S150, an air introduction mode is determined based on the calculated TAO. That is, as the TAO increases to the high temperature side from the low temperature side, the air introduction mode is set to be switched to an entire outside air mode from an entire inside air mode via an inside/outside air mixing mode, or directly to the entire outside air mode from the entire inside air mode.

At step S160, the air-blowing mode is determined according to the calculated TAO. As shown by the graph in FIG. 4, as the TAO increases to the high temperature side from the low temperature side, the air-blowing mode is set to be switched to the foot mode (FOOT) from the face mode (FACE) via the bi-level mode (B/L).

At step S160, the face mode and the bi-level mode are finally determined, but the foot mode is temporarily determined. The foot mode is finally determined at step S180 in FIG. 2. Therefore, when the foot mode is temporarily determined at step S160, step S160 proceeds to step S180 via step S170, and the foot mode or the foot/defroster mode (F/D) is selected at step S180. This mode selection at step S180 will be described in detail hereinafter with reference to FIG. 5.

Figure 4:
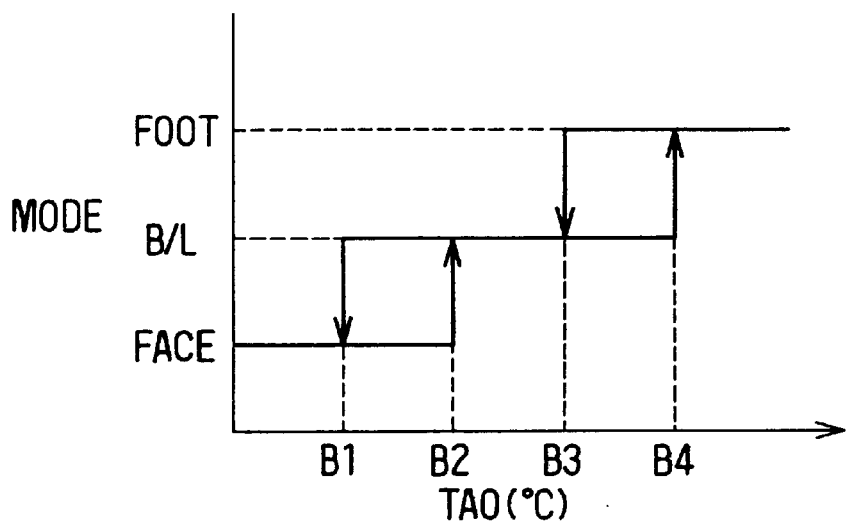
FIG. 4 is a characteristic view showing a relationship between an air-blowing mode and a target temperature (TAO) of air blown into the passenger compartment according to the first embodiment.

In FIG. 4, for example, mode switching temperatures B1, B2 are about 25–29° C., and mode switching temperatures B3, B4 are about 40° C.

Next, at step S190, on/off operation of the compressor 40 is determined by comparing the actual evaporator air temperature Te to a target evaporator air temperature TEO. That is, when the evaporator air temperature Te is lower than the target evaporator air temperature TEO, the operation of the compressor 40 is stopped. On the other hand, when the evaporator air temperature Te is higher than the target evaporator air temperature TEO, the operation of the compressor 40 is started.

At step S200, respective control values calculated at steps S130–S190 are output to the electric driving units 19–21 and the driving circuits 37, 38, thereby performing the air conditioning control of the vehicle air conditioner 1. That is, the electric driving unit 20 controls the operational position of the inside/outside air switching damper 4 so that an air introduction mode determined at step S150 is set. The electric driving unit 21 controls the opening degree of the air mixing damper 14 in order that the actual opening degree θ of the air mixing damper 14 detected by the opening degree detection sensor 28 becomes equal to the target opening degree SW calculated at step S130. By controlling Voltage fed to the fan driving motor 10, the rotational speed of the fan driving motor 10 is controlled so that the target flow amount BLW calculated at step S140 is obtained. The electromagnetic clutch 41 performs ON/OFF control operation of the compressor 40 so that the actual evaporator air temperature Te becomes the target evaporator air temperature TEO.

Next, mode selection (automatically switching) between the foot mode (FOOT) and the foot/defroster mode (F/D) will be described in detail with reference to FIG. 5. In the first embodiment, as shown in the graph of FIG. 4, when the TAO is in a temperature area where the TAO is higher than the mode switching temperature B3, the foot mode is temporarily determined. Then, step S170 in FIG. 2 proceeds to step S1810 in FIG. 5, and it is determined whether or not it is the warm-up control.

Figure 6A:
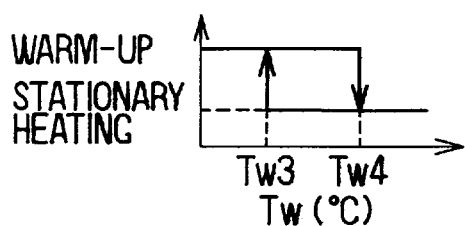
FIGS. 6A–6G are characteristic views showing control operation of the vehicle air conditioner, respectively, according to the first embodiment.

As described in FIG. 3B, the air amount blown by the blower 7 is restricted when the water temperature Tw flowing into the heater core 12 is lower than the first predetermined temperature Tw1. As shown in FIG. 6A, when the water temperature Tw is lower than a third predetermined temperature Tw3 higher than the first predetermined temperature Tw1, the warm-up control is determined. When the water temperature Tw is higher than a fourth predetermined temperature Tw4, it is determined that the warm-up control is finished and the stationary heating control is performed.

The fourth predetermined temperature Tw4 in FIG. 6A corresponds to the second predetermined temperature Tw2 (e.g., 60° C.) in FIG. 3B, and is slightly higher than the third predetermined temperature Tw3.

Figure 6B:
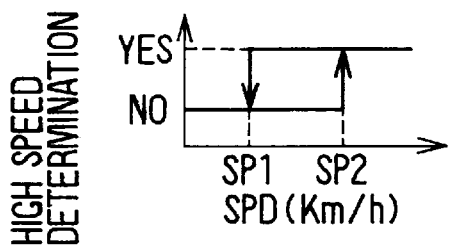

When the warm-up control is not determined at step S1810, that is, when the stationary heating control is performed, control operation proceeds from step S1810 to step S1820. At step S1820, it is determined whether or not the vehicle speed SPD is higher than a predetermined value SPo. Specifically, as shown in FIG. 6B, when the vehicle speed SPD is higher than a second predetermined value SP2, it is determined that the vehicle speed SPD is higher than the predetermined value SPo (YES). When the vehicle speed SPD is lower than a first predetermined value SP1, it is determined that the vehicle speed is lower than the predetermined value SPo (NO). For example, the second predetermined value SP2 is approximately 30 km/h and the first predetermined value SP1 is approximately 20 km/h.

Figure 7:
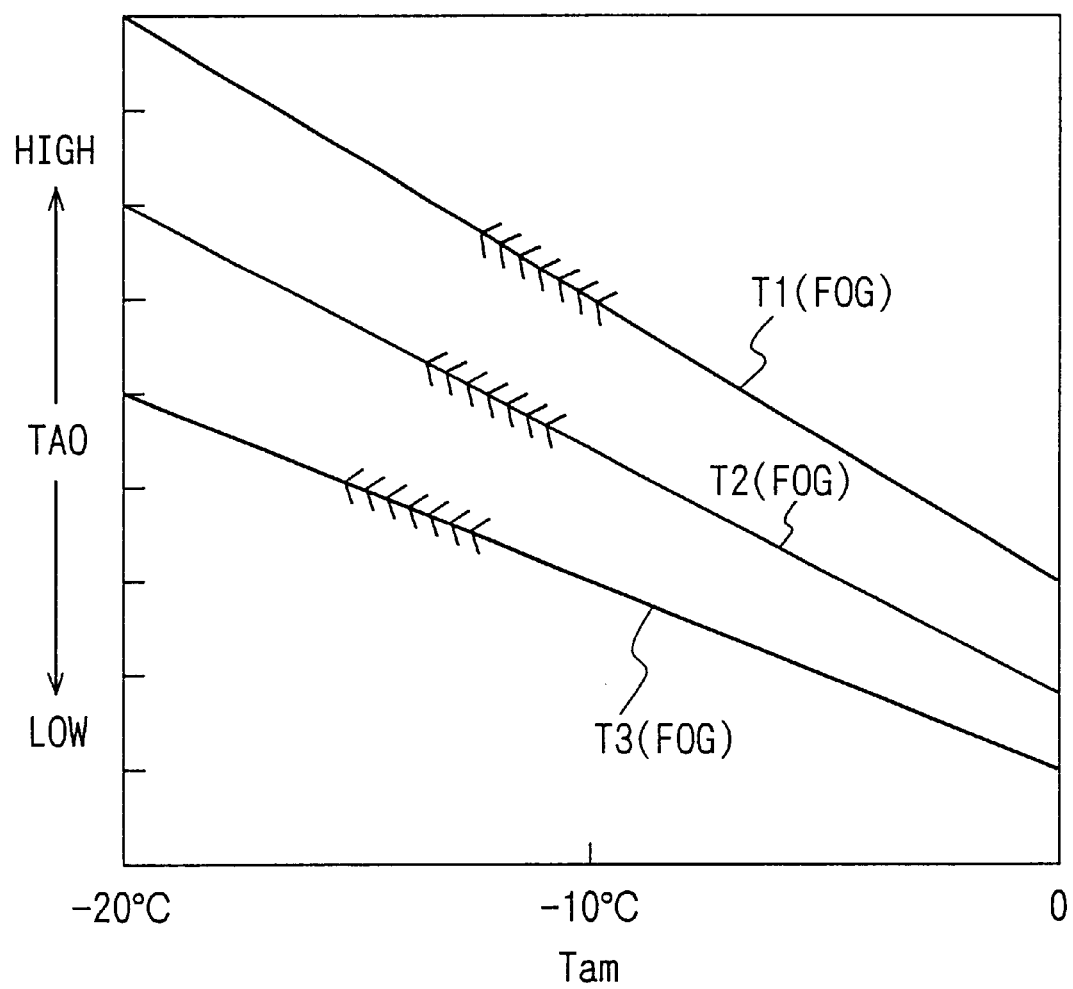
FIG. 7 is a graph showing fog-generating threshold temperature of the target temperature (TAO) of air with an outside air temperature (Tam) and a vehicle speed according to the first embodiment.

When the vehicle speed is higher than the predetermined value SPo at step S1820, it is determined whether or not TAO is lower than a fog threshold temperature T(FOG). The determination is specifically performed based on the graph shown in FIG. 7. The present inventors performed various tests, so that the graph of FIG. 7 is found. In the graph of FIG. 7, the fog threshold temperature T(FOG) of TAO is determined according to the outside air temperature Tam and the vehicle speed SPD. T1(FOG) is a fog threshold temperature line when the vehicle speed SPD is 100 Km/h, T2(FOG) is a fog threshold temperature line when the vehicle speed SPD is 70 Km/h, and T3(FOG) is a fog threshold temperature line when the vehicle speed SPD is 40 Km/h.

In the graph shown in FIG. 3A, at the high-temperature area where TAO is higher than the predetermined temperature T1, the foot mode is set. At the stationary heating control, when the TAO becomes higher than the predetermined temperature T1, the amount of air blown into the passenger compartment is increased, thereby increasing the windshield temperature and improving the fog-preventing performance of the windshield. On the other hand, as the vehicle speed becomes higher, the windshield temperature becomes lower, the windshield is readily fogged. As shown in FIG. 7, because the fog threshold temperature T(FOG) of the TAO increases as the vehicle speed is faster. Further, as the outside air temperature Tam becomes lower, the windshield temperature becomes lower, thereby enlarging the fog-generating area. Therefore, as the outside air temperature becomes lower, the fog threshold temperature T(FOG) of the TAO, which is determined by the vehicle speed, becomes higher. In FIG. 7, a temperature area lower than the fog threshold temperature lines T1(FOG), T2(FOG), T3(FOG) of the TAO, determined by the vehicle speed SPD, is the windshield fog generating area of the TAO, and a temperature area higher than that is the windshield clear area of the TAO.

Figure 6C:
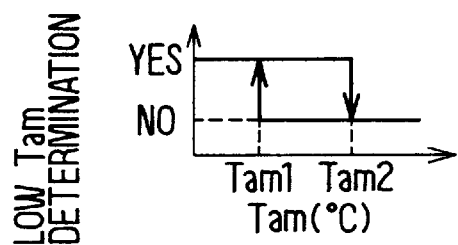

At step S1830, it is determined whether or not the TAO is lower than the fog threshold temperature (i.e., the fog-generating area temperature). When the TAO is lower than the fog threshold temperature T(FOG), it proceeds to step S1840 and it is determined whether or not the outside air temperature Tam is low. As shown in FIG. 6C, specifically, when the outside air temperature Tam is lower than a first predetermined temperature Tam1 (e.g., −1° C.), it is determined that the outside air temperature is low (YES). When the outside air temperature Tam is higher than a second predetermined temperature Tam2 (e.g., 0° C.), it is determined that the outside air temperature Tam is not low (NO).

Figure 6D:
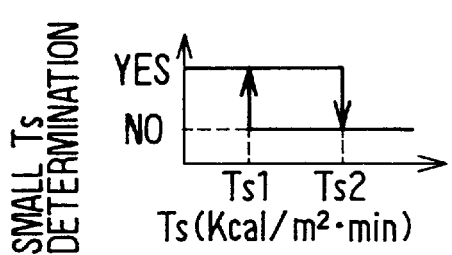

When the outside air temperature Tam is low at step S1840, it is determined whether or not the sunlight amount Ts is small at step S1850. As shown in FIG. 6D, specifically, when the sunlight amount Ts is smaller than a first predetermined amount Ts1, it is determined that the sunlight amount Ts is small (YES). When the sunlight amount Ts is larger than a second predetermined amount Ts2, it is determined that the sunlight amount Ts is not small (NO). For example, the second predetermined amount Ts2 is approximately 5 K cal/m²·min, and the first predetermined amount Ts1 is slightly smaller than the second predetermined amount Ts1.

When it is determined that the sunlight amount Ts is small at step S1850, the foot/defroster mode is set at step S1860. During the stationary heating control after the warm-up control is finished, when the following four conditions are satisfied, it is estimated that the windshield is readily fogged, and the foot/defroster mode is automatically selected. Here, a first condition is that the vehicle speed SPD is higher than the predetermined value (step S1820), a second condition is that the TAO is lower than the fog threshold temperature line in FIG. 7 (step S1830), a third condition is that the outside air temperature Tam is low (step S1840) and a fourth condition is that the sunlight amount Ts is low (step S1850).

When the windshield-fogging condition (e.g., first through fourth conditions) is determined, the foot/defroster mode is automatically set. Therefore, the air amount blown from the defroster outlet 15 is increased so that the fog-preventing performance is improved. Further, because the driver is not necessary to manually set the foot/defroster mode, a manual operation annoying the driver is not necessary.

Figure 5:
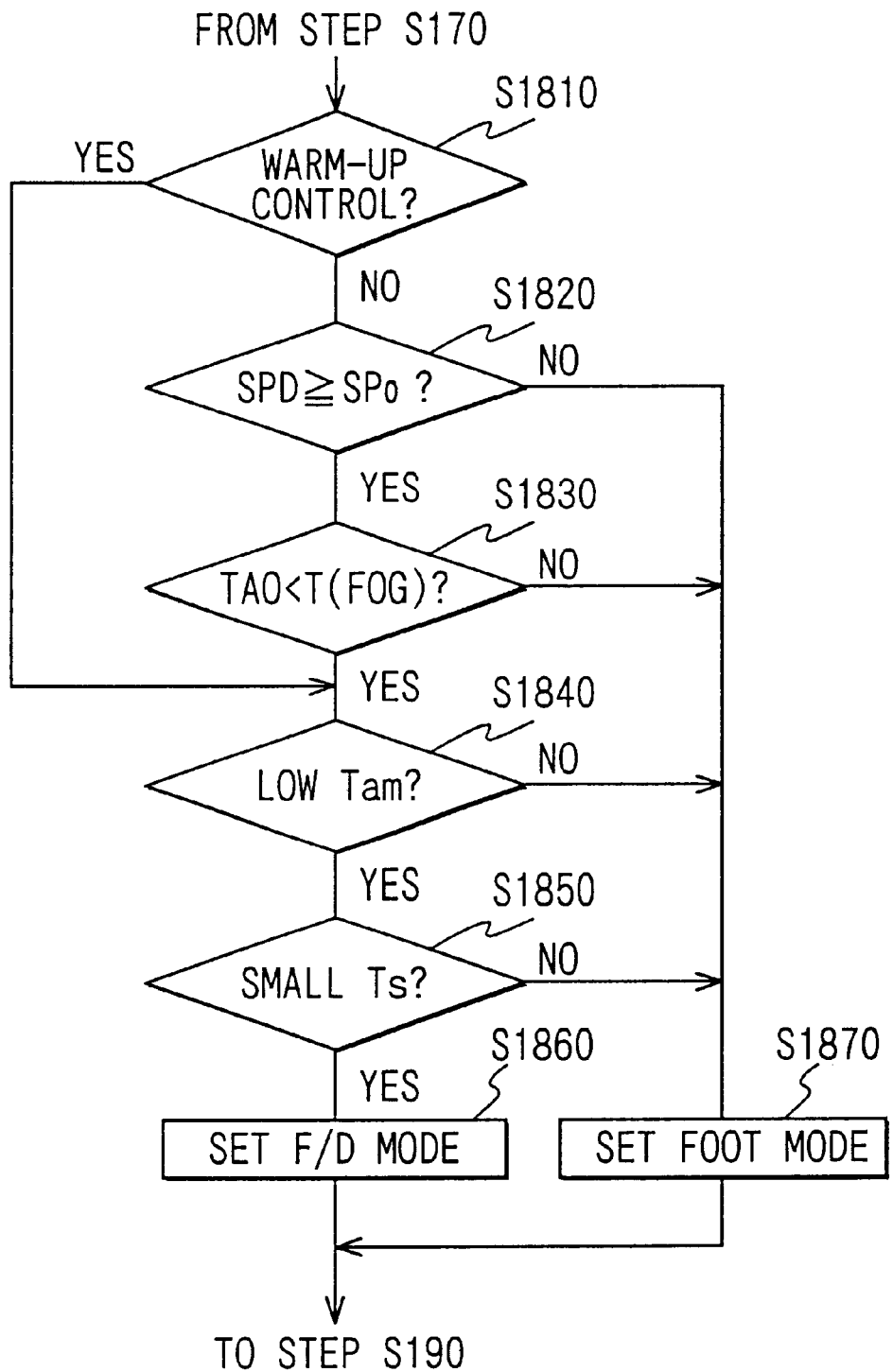
FIG. 5 is a flow diagram showing a main control process of the ECU of the vehicle air conditioner according to the first embodiment.

In FIG. 5, when any one of the above-descried first through fourth conditions is not satisfied, control operation proceeds to step S1870, and the foot mode is selected. Therefore, the foot mode can be always set, when the windshield-fogging condition is not determined, so that the heating performance of the passenger compartment can be improved at a cold time.

Figure 6E:
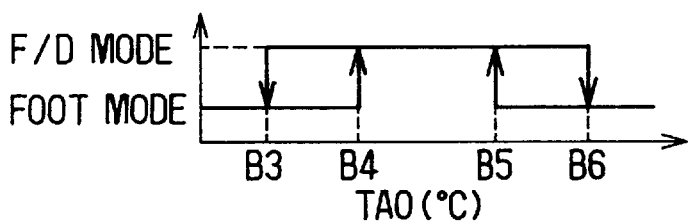

In the above-described stationary heating control, the condition that the TAO is lower than the fog threshold temperature line in FIG. 7 is a condition that TAO is lower than predetermined temperature B5 or B6 shown in FIG. 6E. The predetermined temperature B5 is calculated based on the following formula (3).

$$B5 = Tam \times X + Y \tag{3}$$

Figure 6F:
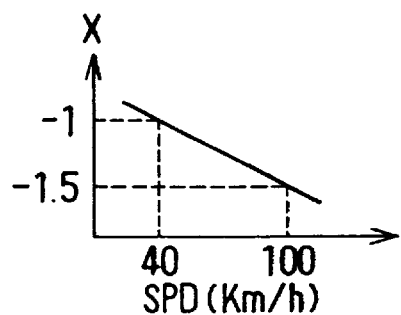
Figure 6G:
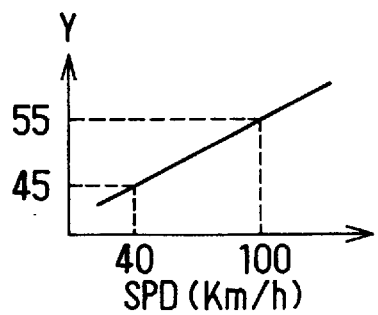

Wherein, X and Y are respectively determined based on the vehicle speed SPD in accordance with the graphs shown in FIGS. 6F, 6G, and B5≧44.

The predetermined temperature B6 is calculated based on the following formula (4).

$$B6 = B5 + 4 \tag{4}$$

When the warm-up control is determined at step S1810, control operation proceeds to step S1840 and it is determined whether or not the outside air temperature Tam is low by the way shown in FIG. 6C, for example. When it is determined that the outside air temperature Tam is low, control operation proceeds to step S1850 and it is determined whether or not the sunlight amount Ts is small by the way shown in FIG. 6D, for example.

When it is determined that the sunlight amount Ts is small, control operation proceeds to step S1860, and the foot/defroster mode is selected. That is, when the third condition (step S1840) and the fourth condition (step S1850) are satisfied in the warm-up control, it is estimated that the windshield is readily fogged, and the foot/defroster mode is automatically selected.

Since the water temperature Tw flowing into the heater core 12 is low in the warm-up control, the temperature of air blown into the passenger compartment becomes lower, and therefore, the amount of air blown into the passenger compartment also becomes smaller by the control operation in FIG. 3B. Accordingly, in the warm-up control, the windshield is readily fogged only by these two third and fourth conditions. Accordingly, in the warm-up control, when only the third condition and the fourth condition are satisfied, it is determined that the windshield is readily fogged, and the foot/defroster mode is automatically selected. Even if the vehicle speed SPD is low or the TAO is high, when only the third condition and the fourth condition are satisfied, the foot/defroster mode is selected in the warm-up control. As a result, the fog-preventing performance can be automatically ensured in the warm-up control without a manual operation.

When any one of the third and fourth conditions is not satisfied in the warm-up control, the foot mode is selected at step S1870, and therefore, the heating performance of the passenger compartment can be improved even during the warm-up control.

Figure 8:
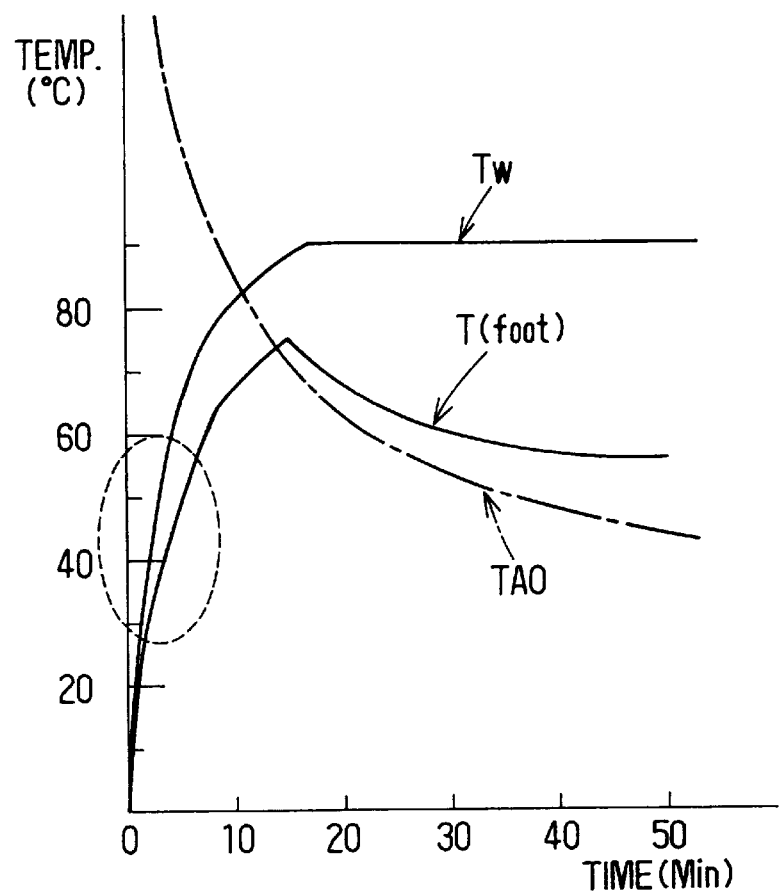
FIG. 8 is a graph showing temperature changes when heating operation is changed from a warm-up control to a stationary heating control according to the first embodiment.

FIG. 8 shows temperature variations when the heating operation is changed from the warm-up control to the stationary heating control. In FIG. 8, an elapsed time, after heating operation in winter starts, is indicated in the abscissa. That is, FIG. 8 shows variations in the water temperature Tw flowing into the heater core 12, in air temperature T(foot) blown from the foot outlet 17 and in the TAO, relative to the elapsed time (t). The above-described selection between the foot mode and the foot/defroster mode is performed, in the warm-up control, in a range shown by a chain line in FIG. 8.

In FIG. 5, during the stationary heating control after the warm-up control, the windshield-fogging condition is determined based on the vehicle speed SPD, the fog threshold temperature T(FOG) of the TAO, the outside air temperature Tam and the sunlight amount Ts, and the foot/defroster mode is automatically selected when the windshield-fogging condition is satisfied. Further, during the warm-up control, the windshield-fogging condition is determined based on the outside air temperature Tam and the sunlight amount Ts, and the foot/defroster mode is automatically selected when the windshield-fogging condition is satisfied. However, because the windshield fog-generation depends largely on the windshield temperature, a temperature sensor for directly detecting the windshield temperature can be provided on the inner surface of the windshield at a suitable position. When the windshield temperature directly detected by the temperature sensor becomes lower than or equal to a predetermined temperature, the foot/defroster mode can be automatically selected. When it is determined that the windshield temperature becomes lower than or equal to the predetermined temperature and TAO becomes lower than or equal to the fog threshold temperature, the foot/defroster mode can be automatically selected.

Further, even in the stationary heating control, the windshield-fogging condition where the windshield is readily fogged can be determined based on at least any one of the vehicle speed SPD, the fog threshold temperature T(FOG) of TAO and the sunlight amount Ts, and the foot/defroster mode can be automatically selected when the windshield-fogging condition is determined. In the warm-up control, the windshield-fogging condition can be determined based on at least any one of the outside air temperature Tam and the sunlight amount Ts, and the foot/defroster mode can be automatically selected when the windshield-fogging condition is determined.

A second preferred embodiment of the present invention will be now described with reference to FIGS. 8 and 9. In the second embodiment, the air amount blown into the passenger compartment is controlled to further improve the windshield fog-preventing performance during the foot/defroster mode.

In the above-described first embodiment of the present invention, when the foot/defroster mode is selected in the stationary heating control determined at step S1810 in FIG. 5, the TAO is lower than the fog threshold temperature of the graph in FIG. 7 at step S1830. Further, even during the foot/defroster mode, when the TAO is around the predetermined temperature T1 on a relatively lower temperature side in FIG. 3A, the amount of air blown into the passenger compartment is reduced according to control characteristics of the target flow amount BLW shown in FIG. 3A. As a result, even during the foot/defroster mode, the windshield may be readily fogged due to the reduction of the windshield temperature and the air amount blown into the passenger compartment.

Figure 9:
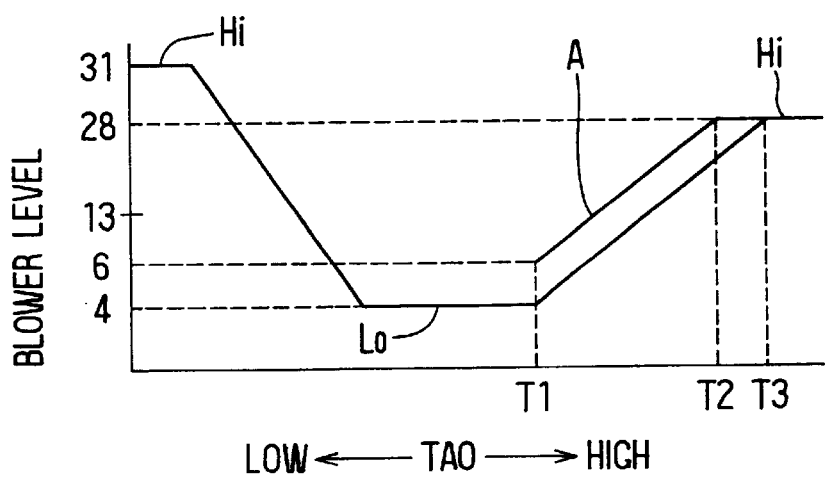
FIG. 9 is a characteristic view showing a relationship between a blower level and a target temperature (TAO) of air according to a second preferred embodiment of the present invention.

In the second embodiment, as shown in FIG. 9, when the foot/defroster mode is selected, the amount of air blown into the passenger compartment is increased by a predetermined amount, as compared with a case during the foot mode.

FIG. 9 is a graph showing the relationship between the blower level and the TAO, similarly to FIG. 3A. In FIG. 9, the blower level indicates a voltage level (i.e., motor revolution speed levels) applied to the fan driving motor 10. In the second embodiment, on the low-temperature side of the TAO (cooling side), the blower level is changed between 4 (i.e., lowest level Lo) and 31 (i.e., highest level Hi). On the high-temperature side of the TAO (heating side), the blower level is changed between 4 (i.e., lowest level Lo) and 28 (i.e., highest level Hi).

In the second embodiment, when the foot/defroster mode is selected at step S1860 in FIG. 5, the blower level is increased uniformly by a predetermined value (e.g., 2 levels), as compared with the basic control graph (i.e., the blower level during the foot mode). Accordingly, the amount of air blown into the passenger compartment is increased when the foot/defroster mode is selected, and the windshield fog-preventing performance can be further improved. In FIG. 9, specifically, T1, T2 and T3 are 42° C., 75° C. and 78° C., respectively.

In the second embodiment, the other parts are similar to those of the above-described first embodiment, and therefore, the effect similar to the first embodiment can be obtained.

Figure 10:
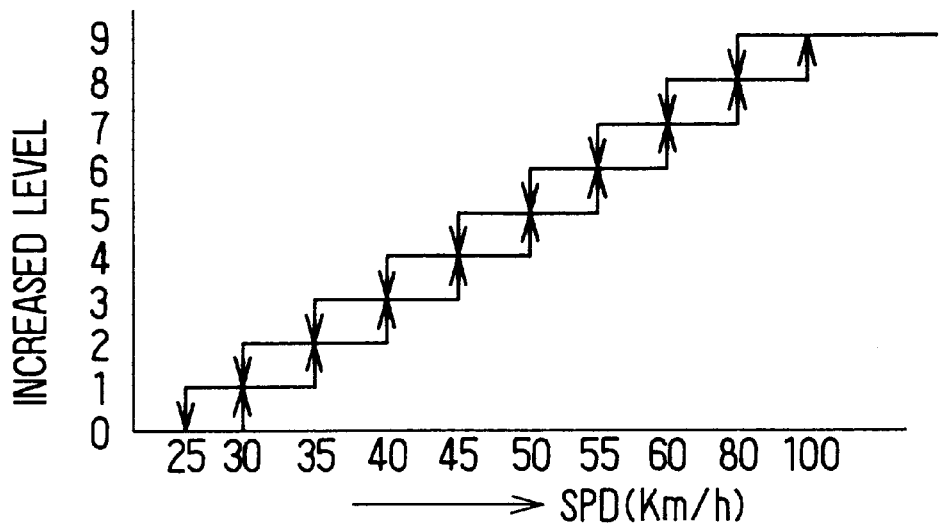
FIGS. 10 is a characteristic view showing a relationship between an increase level of a blower level and a vehicle speed according to a third preferred embodiment of the present invention.
Figure 11A:
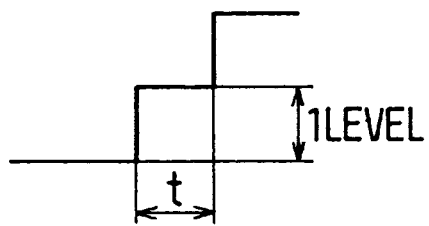
FIGS. 11A and 11B are views for explaining delay control operations, when the vehicle speed increases and decreases, respectively, according to third embodiment.
Figure 11B:
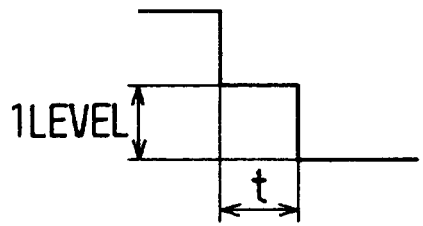

A third preferred embodiment of the present invention will be now described with reference to FIGS. 10–11B. In the third embodiment, the air amount blown into the passenger compartment is controlled to further improve the windshield fog-preventing performance during the foot/defroster mode. Specifically, in the third embodiment, when the foot/defroster mode is set, the air amount blown into the passenger compartment is increased and is controlled finely.

During the foot/defroster mode, the windshield is readily fogged when the air amount blown into the passenger compartment is made lower. Therefore, in the third embodiment, first, only when the air amount blown into the passenger compartment is at the low air amount side, the air amount blown by the blower 7 is increased. For example, the air amount blown by the blower 7 is increased during the foot/defroster mode, only in a low air amount range where the blower level in FIG. 9 is between 4 levels and 13 levels.

Secondly, as the vehicle speed SPD becomes higher, an increase ratio of the air amount blown by the blower 7 becomes larger during the foot/defroster mode, thereby further improving the windshield fog-preventing performance. FIG. 10 shows an increased level of the blower level with an increase of the vehicle speed SPD. When the vehicle speed SPD is at a low vehicle speed lower than or equal to 30 km/h, the increased level is set at 0 level. When the vehicle speed SPD is higher than 30 km/h and is lower than 100 km/h, the blower level is increased by 1 level for every 5 km/h increase in the vehicle speed. When the vehicle speed SPD is at a high vehicle speed higher than or equal to 100 km/h, the blower level is increased by 9 levels, as compared with a case where the vehicle speed SPD is lower than or equal to 30 km/h.

Thirdly, the change of the air amount blown by the blower 7 is controlled to be delayed relative to the vehicle speed change. If the air amount blown by the blower 7 is rapidly changed in accordance with rapid change of the vehicle speed, air-blowing noise transmitted into the passenger compartment is rapidly changed, and a passenger in the passenger compartment feels uneasy. Therefore, the delay control is employed for preventing the air amount blown by the blower 7 from rapidly being changed. FIGS. 11A, 11B show the delay control of the air amount blown by the blower 7. In both cases when the vehicle speed increases as shown in FIG. 11A and decreases as shown in FIG. 11B, the blower level is maintained for a predetermined time "t" (e.g., 2 seconds) every 1 level change of the blower level.

Accordingly, even if the vehicle speed is rapidly increased or decreased, the air amount blown by the blower 7 can be controlled to be delayed relative to the vehicle speed change, thereby preventing the rapid change of the air amount.

In the second and third embodiments, the air amount control is described during the foot/defroster mode due to the automatic control. However, even when the foot/defroster mode or the defroster mode is set by a manual operation, the air amount control described in the second and third embodiments can be used only when the air amount is automatically controlled.

When the air-blowing mode is switched from the foot/defroster mode to the bi-level mode by the automatic control according to the reduction of TAO, or when the air-blowing mode is switched from the foot/defroster mode to the bi-level mode or the face mode by a manual operation, the air amount is reduced in accordance with a mode switching operation. In this case, the air amount blown by the blower 7 can be gradually reduced by the delay control due to a timer unit.

The present invention is not limited to the above-described embodiments, and it can be embodied in various changes and modifications.

For example, in the first embodiment, during the heating operation in winter, the warm-up control and the stationary heating control are determined based on the water temperature Tw of the heater core 12. However, for example, the warm-up control or the stationary heating control may be determined by determining whether or not the inside air temperature Tr increases to a predetermined temperature because the inside air temperature Tr gradually increases after starting heating.

In the graph shown in FIG. 7, the fog threshold temperature of the TAO is determined by the vehicle speed SPD and the outside air temperature Tam. However, as shown in FIG. 3A, when the TAO increases in a range of the foot mode, the air amount blown by the blower 7 is increased to improve the fog preventing performance of the windshield. Therefore, the air amount blown by the blower 7 may be used as the ordinate in FIG. 7, and a fog threshold air amount may be determined by the vehicle speed SPD and the outside air temperature Tam, similarly to FIG. 7. Further, at step S1830 in FIG. 5, it may be determined whether the air amount blown from the blower 7 is lower than the fog threshold air amount.

Further, while the vehicle speed SPD is sampled at a predetermined time interval (e.g., 500 ms), the present control value of the vehicle speed is calculated, by adding 63.2% value of a deviation (a response of a time constant τ) between a preceding control value of the vehicle speed and the present detected value thereof, to the preceding control value of the vehicle speed. According to this vehicle speed calculation, the control value of the vehicle speed, whose change value is restricted relative to a change of the actual vehicle speed, is used for the determination at step S1820. Therefore, an unreasonable mode switch due to a rapid change of the vehicle speed can be prevented.

In the first embodiment, an explanation of a side face outlet through which air is blown toward a side windshield or a side upper side of the passenger compartment is omitted. However, the side face outlet, through which conditioned air always flows during any one air-blowing mode, may be provided at a downstream end of the air conditioning case 2.

Such changes and modifications are to be understood as being within the scope of the present invention as defined by the appended claims.

What is claimed is:

1. An air conditioner for a vehicle having a passenger compartment, the air conditioner comprising:

an air conditioning case for defining an air passage, the air conditioning case having a foot outlet through which air is blown toward a lower side of the passenger compartment, and a defroster outlet through which air is blown toward a windshield;

a blower for blowing air into the passenger compartment through the air passage;

a heating heat exchanger, disposed in the air passage, for heating air to be introduced into the passenger compartment; and a control unit which controls an air state blown into the passenger compartment to set a foot mode where air is mainly blown from the foot outlet while a small amount of air is blown from the defroster outlet, and to set a foot/defroster mode where an amount of air blown from the foot outlet is reduced and an amount of air blown from the defroster outlet is increased as compared with the foot mode, wherein:

the control unit sets the foot mode when a target temperature of air blown into the passenger compartment is higher than or equal to a predetermine target value; and the control unit selects the foot/defroster mode in place of the foot mode, when at least one of a first condition where a vehicle speed is higher than or equal to a predetermined speed and a second condition where a sunlight amount entering into the passenger compartment is lower than or equal to a predetermined amount is satisfied.

2. The air conditioner according to claim 1, wherein:

the control unit selects the foot/defroster mode in place of the foot mode, when the vehicle speed is higher than or equal to the predetermined speed and when the sunlight amount entering into the passenger compartment is lower than or equal to the predetermined amount.

3. The air conditioner according to claim 1, wherein:

the foot/defroster mode is selected in place of the foot mode, when a third condition where an outside air temperature is lower than or equal to a predetermined outside temperature is further satisfied in addition to the first and second conditions.

4. The air conditioner according to claim 1, wherein:

when the target temperature of air blown into the passenger compartment is higher than or equal to the predetermined target value, the control unit increases the air amount blown by the blower into the passenger compartment in accordance with an increase of the target temperature.

5. The air conditioner according to claim 1, wherein:

the control unit selects the foot/defroster mode in place of the foot mode, when a fourth condition, where the target temperature of air blown into the passenger compartment is lower than a fog threshold temperature of the target temperature, determined by the vehicle speed, is satisfied in addition to the first and second conditions.

6. The air conditioner according to claim 5, wherein:

as the outside air temperature becomes lower, the fog threshold temperature of the target temperature becomes higher.

7. The air conditioner according to claim 1, wherein:

the control unit determines whether it is in a warm-up control immediately after a start time of heating due to the heating heat exchanger or in a stationary heating control after the warm-up control; and the control unit selects the foot/defroster mode during the stationary heating control, when at least one of the first and second conditions is satisfied.

8. The air conditioner according to claim 1, wherein:

the control unit determines whether it is in a warm-up control immediately after a start time of heating due to the heating heat exchanger or in a stationary heating control after the warm-up control; and the control unit selects the foot/defroster mode in the warm-up control when the sunlight amount entering into the passenger compartment is lower than the predetermined amount.

9. The air conditioner according to claim 8, wherein the control unit selects the foot/defroster mode in the warm-up control, when the outside air amount is lower than a predetermined outside temperature, and when the sunlight amount entering into the passenger compartment is lower than the predetermined amount.

10. The air conditioner according to claim 1, wherein when the control unit selects the foot/defroster mode, the amount of air blown into the passenger compartment by the blower is increased as compared with that during the foot mode.

11. The air conditioner according to claim 10, wherein
when the control unit selects the foot/defroster mode, the amount of air blown into the passenger compartment by the blower is always increased by a predetermined amount as compared with that during the foot mode.

12. The air conditioner according to claim 1, wherein
when the control unit selects the foot/defroster mode, the amount of air blown by the blower into the passenger compartment is increased in accordance with an increase of the vehicle speed.

13. An air conditioner for a vehicle having a passenger compartment, the air conditioner comprising:
an air conditioning case for defining an air passage, the air conditioning case having a foot outlet through which air is blown toward a lower side of the passenger compartment, and a defroster outlet through which air is blown toward a windshield;
a blower for blowing air into the passenger compartment through the air passage;
a heating heat exchanger, disposed in the air passage, for heating air to be introduced into the passenger compartment; and
a control unit which controls an air state blown into the passenger compartment to set a foot mode where air is mainly blown from the foot outlet while a small amount of air is blown from the defroster outlet, and to set a foot/defroster mode where an amount of air blown from the foot outlet is reduced and an amount of air blown from the defroster outlet is increased as compared with the foot mode, wherein:
the control unit sets the foot mode when a target temperature of air blown into the passenger compartment is higher than or equal to a predetermine target value; and
the control unit selects the foot/defroster mode in place of the foot mode, when a temperature of the windshield is lower than a predetermined temperature.

14. The air conditioner according to claim 13, wherein:
when the target temperature of air blown into the passenger compartment is higher than or equal to the predetermined target value, the control unit increases the air amount blown by the blower into the passenger compartment in accordance with an increase of the target temperature; and
the control unit selects the foot/defroster mode in place of the foot mode, when a condition, where the target temperature of air blown into the passenger compartment is lower than a fog threshold temperature of the target temperature, determined based on a vehicle speed, is satisfied in addition to the condition where the temperature of the windshield is lower than the predetermined temperature.

15. The air conditioner according to claim 14, wherein:
as an outside air temperature becomes lower, the fog threshold temperature of the target temperature becomes higher.

16. The air conditioner according to claim 13, wherein:
the control unit determines whether it is in a warm-up control immediately after a start time of heating due to the heating heat exchanger or in a stationary heating control after the warm-up control; and
the control unit selects the foot/defroster mode during the stationary heating control, when the temperature of the windshield is lower than the predetermined temperature.

17. The air conditioner according to claim 13, wherein:
the control unit determines whether it is in a warm-up control immediately after a start time of heating due to the heating heat exchanger or in a stationary heating control after the warm-up control; and
the control unit selects the foot/defroster mode in the warm-up control when a sunlight amount entering into the passenger compartment is lower than a predetermined amount.

18. The air conditioner according to claim 17, wherein the control unit selects the foot/defroster mode in the warm-up control when an outside air temperature is lower than a predetermined temperature.

19. An air conditioner for a vehicle having a passenger compartment, the air conditioner comprising:
an air conditioning case for defining an air passage, the air conditioning case having a foot outlet through which air is blown toward a lower side of the passenger compartment, and a defroster outlet through which air is blown toward a windshield;
a blower for blowing air into the passenger compartment through the air passage;
a heating heat exchanger, disposed in the air passage, for heating air to be introduced into the passenger compartment; and
a control unit which controls an air state blown into the passenger compartment to set a foot mode where air is mainly blown from the foot outlet while a small amount of air is blown from the defroster outlet, and to set a foot/defroster mode where an amount of air blown from the foot outlet is reduced and an amount of air blown from the defroster outlet is increased as compared with the foot mode, wherein:
the control unit includes
foot mode selection means for selecting the foot mode when a target temperature of air blown into the passenger compartment is larger than a predetermined target value,
determining means for determining a warm-up control which is generally set at a start time of heating due to the heating heat exchanger, and a stationary heating control after the warm-up control, and
foot/defroster mode selection means for selecting the foot/defroster mode in place of the foot mode;
when the determining means determines the warm-up control, the foot/defroster mode selection means selects the foot/defroster mode when an outside air temperature is lower than a predetermined temperature and when a sunlight amount entering into the passenger compartment is lower than a predetermined amount; and
when the determining means determines the stationary heating control, the foot/defroster mode selection means selects the foot/defroster mode when the outside air temperature is lower than a predetermined temperature and when a vehicle speed is higher than a predetermined speed.

20. The air conditioner according to claim 19, wherein
when the foot/defroster mode selecting means selects the foot/defroster mode, the foot/defroster mode is set in place of the foot mode.

* * * * *